(No Model.)  2 Sheets—Sheet 1.

C. W. FORD.
TRUCK.

No. 281,481. Patented July 17, 1883.

Witnesses.
Wm B Robson
N. J. Osgood

Inventor:
Clayton W. Ford
by
Howard A. Snow
his Atty

N. PETERS, Photo-Lithographer, Washington, D. C.

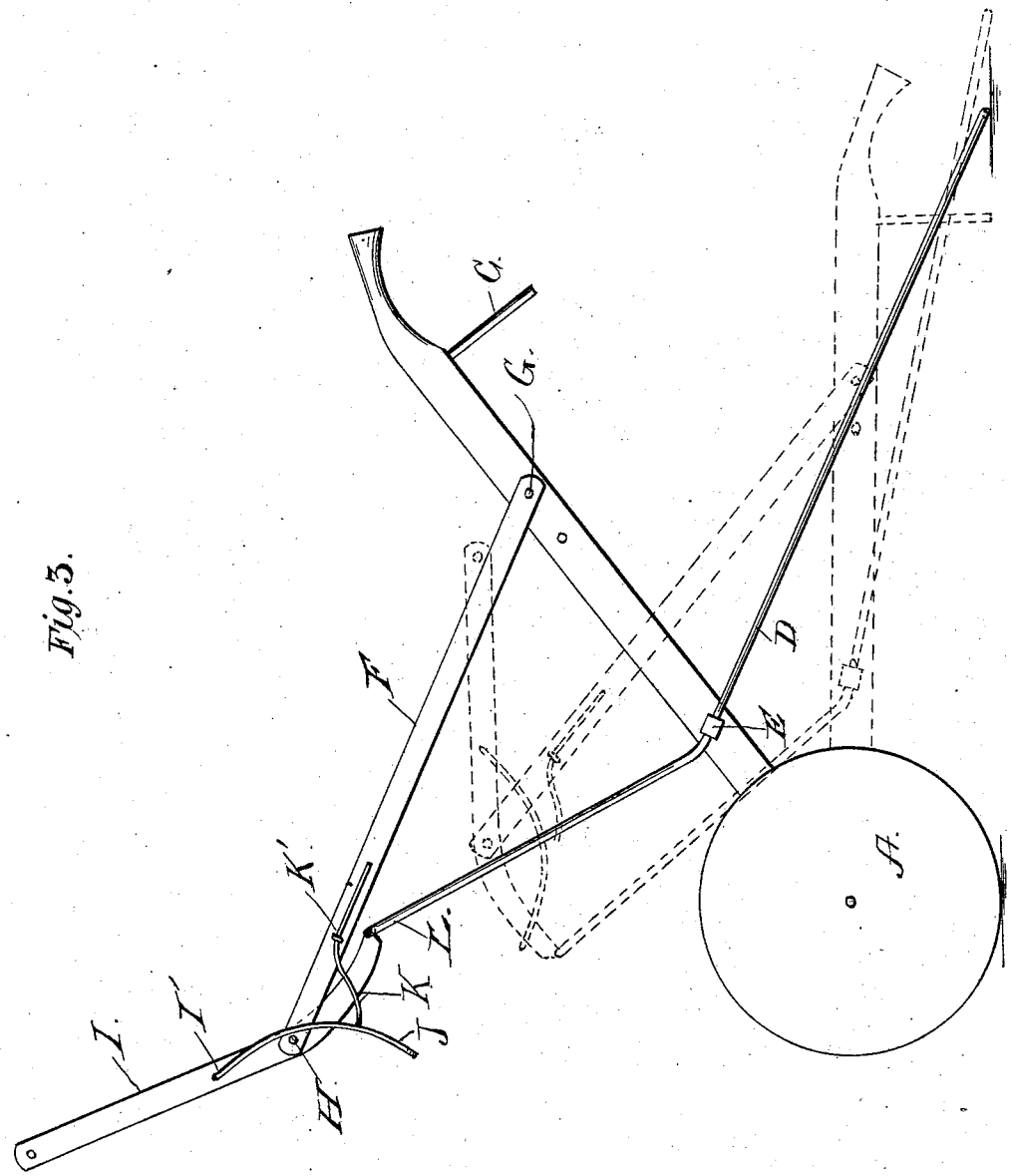

UNITED STATES PATENT OFFICE.

CLAYTON W. FORD, OF FINDLAY, OHIO.

TRUCK.

SPECIFICATION forming part of Letters Patent No. 281,481, dated July 17, 1883.

Application filed April 2, 1883. (No model.)

*To all whom it may concern:*

Be it known that I, CLAYTON W. FORD, a citizen of the United States of America, residing at Findlay, in the county of Hancock and State of Ohio, have invented certain new and useful Improvements in my recently-patented Grain-Loader, of which the following is a specification, reference being had therein to the accompanying drawings.

My invention relates to a device for handling grain-sacks; and it consists in the parts which will be hereinafter described, and pointed out in the claims.

Figure 1:
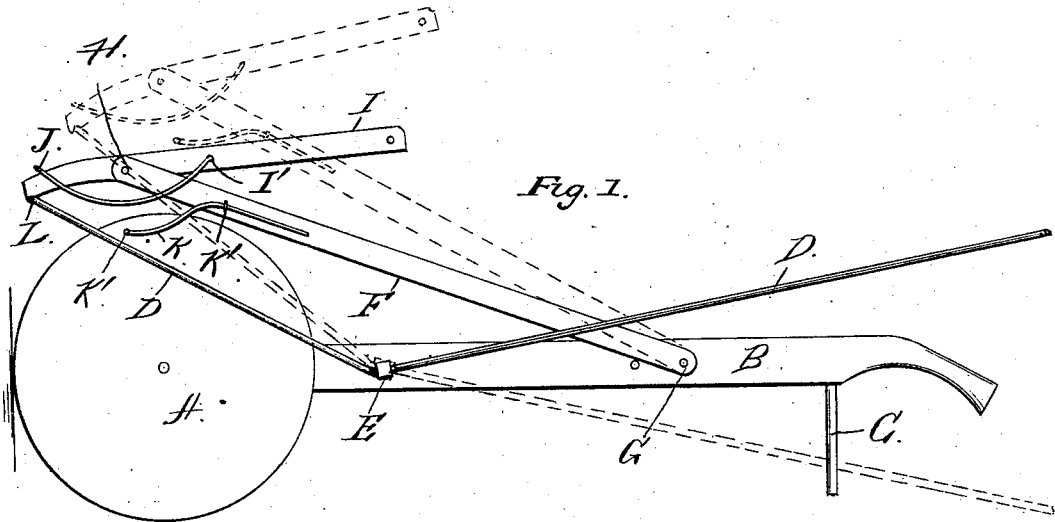
Figure 2:
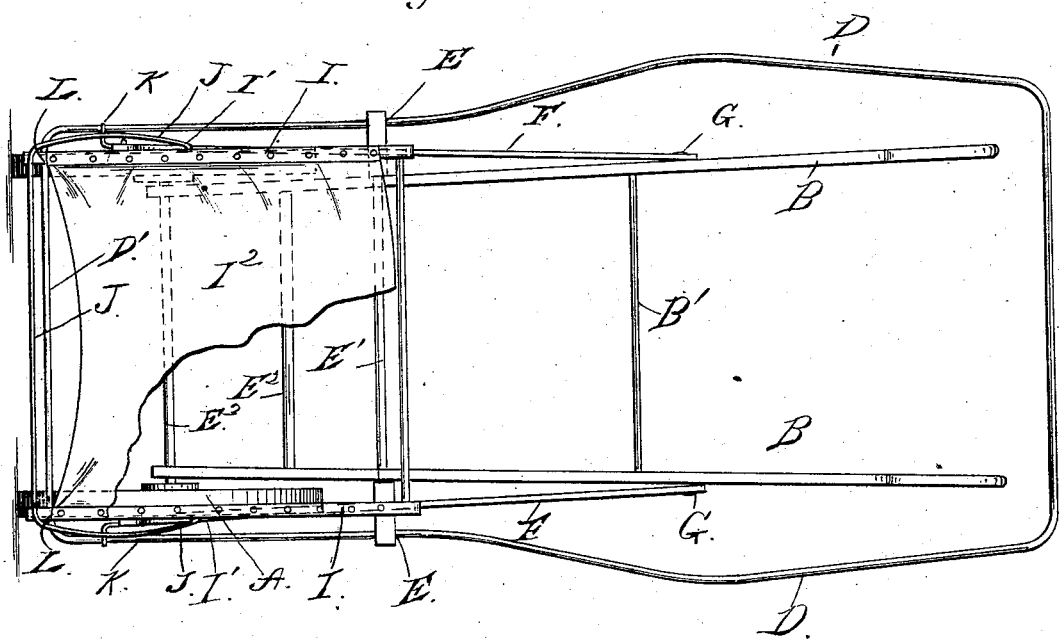

In the accompanying drawings, Figure 1 represents a side view of the machine. The dotted lines indicate the position of the parts when partially elevated. Fig. 2 is a plan view with a part of the cloth removed. Fig. 3 is a side view of the parts elevated to a degree sufficient to dump the sack into a wagon or other elevation.

Like letters indicate like parts throughout the several views.

A represents the wheels upon which the device is mounted. B B are the handles, and C C are legs fixed thereto. D is also a handle, fixed at E to cross-bar E'. Said cross-bar passes through the handles B, and turns freely therein. $E^2$ and B' are cross-braces fixed to handles B. $E^3$ is the axle of the wheels. F F are bars pivoted at G to handles B. H H are pivots uniting bars F to the side of the canvas-frame I, and $I^2$ is the canvas secured to said frame. I' I' are the ends of arm J, pivoted to the sides of frame I. K K are short arms fixed at K' to levers F. L are staples under the forward end of frame I, through which the forward ends of arms D pass.

The device is operated as follows: Assuming the sacks of grain to be standing erect, the forward end of the device is wheeled up to the sack sought to be removed. The handles are then let down and the rear end permitted to rest on legs C, as shown in Fig. 1. The rear end of handle D is then raised, which movement draws down the frame I and canvas $I^2$ in front of the wheel in a perpendicular position. The sack is then tilted back and the handle D lowered to the position shown in Fig. 1. The sack will then lie on its side upon the canvas. It may then be wheeled to the desired place and dumped in the following manner: The handle D should be lowered to the ground or floor, as shown by dotted lines in Fig. 1. The handles B should then be raised, as shown in Fig. 3, when the sack will slide off into the desired receptacle. When the handle B is raised, under those circumstances, the arm K is forced under the cross-arm J, and the bottom of the sack is supported by said arm J until the sack loses its equilibrium and falls forward.

The sacks may, in unloading, be piled up in regular order.

Having thus described my invention and set forth its advantages, I claim as new and desire to secure by Letters Patent—

1. The combination of the handles B D, cross-bar E', bars F, frame I, and canvas $I^2$, substantially as described, and for the purposes set forth.

2. The combination of the handles B D, cross-bar E', bars F, frame I, canvas $I^2$, and arms J K, substantially as described, and for the purposes set forth.

3. The combination of the handles B D, legs C, cross-bars E', bars F, frame I, canvas $I^2$, arms J K, and wheels A, substantially as described, and for the purposes set forth.

In testimony whereof I affix my signature in presence of two witnesses this 20th day of January, A. D. 1883.

CLAYTON W. FORD.

Witnesses:
JAS. A. BOPE,
JAMES W. FREY.